Dec. 31, 1940.  T. A. CHAMBERS ET AL  2,226,922
REGENERATOR FURNACE
Filed Sept. 18, 1939   5 Sheets-Sheet 1
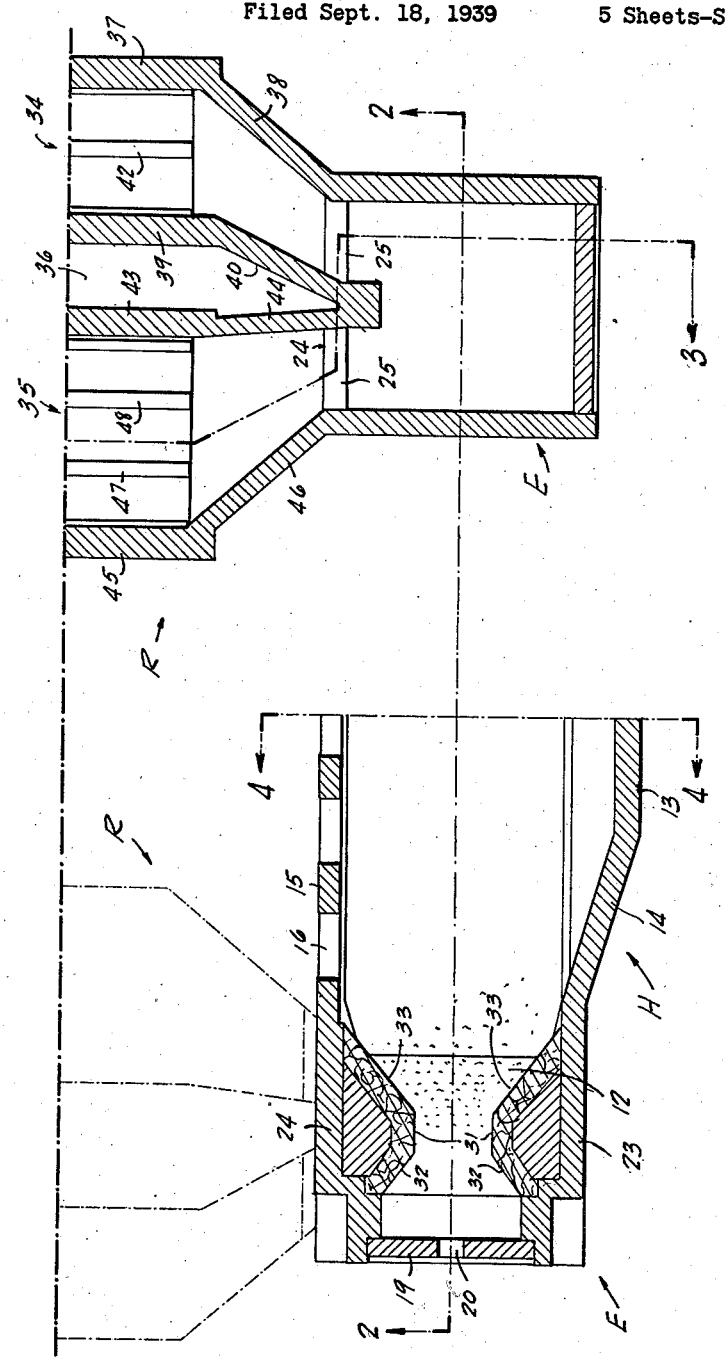
Fig. 1-a
INVENTORS
THOMAS A. CHAMBERS, CHESTER E. DAVIS,
BY ALWIN F. FRANZ AND JOHN T. WHITING
ATTORNEY.

Dec. 31, 1940.  T. A. CHAMBERS ET AL  2,226,922
REGENERATOR FURNACE
Filed Sept. 18, 1939   5 Sheets-Sheet 2
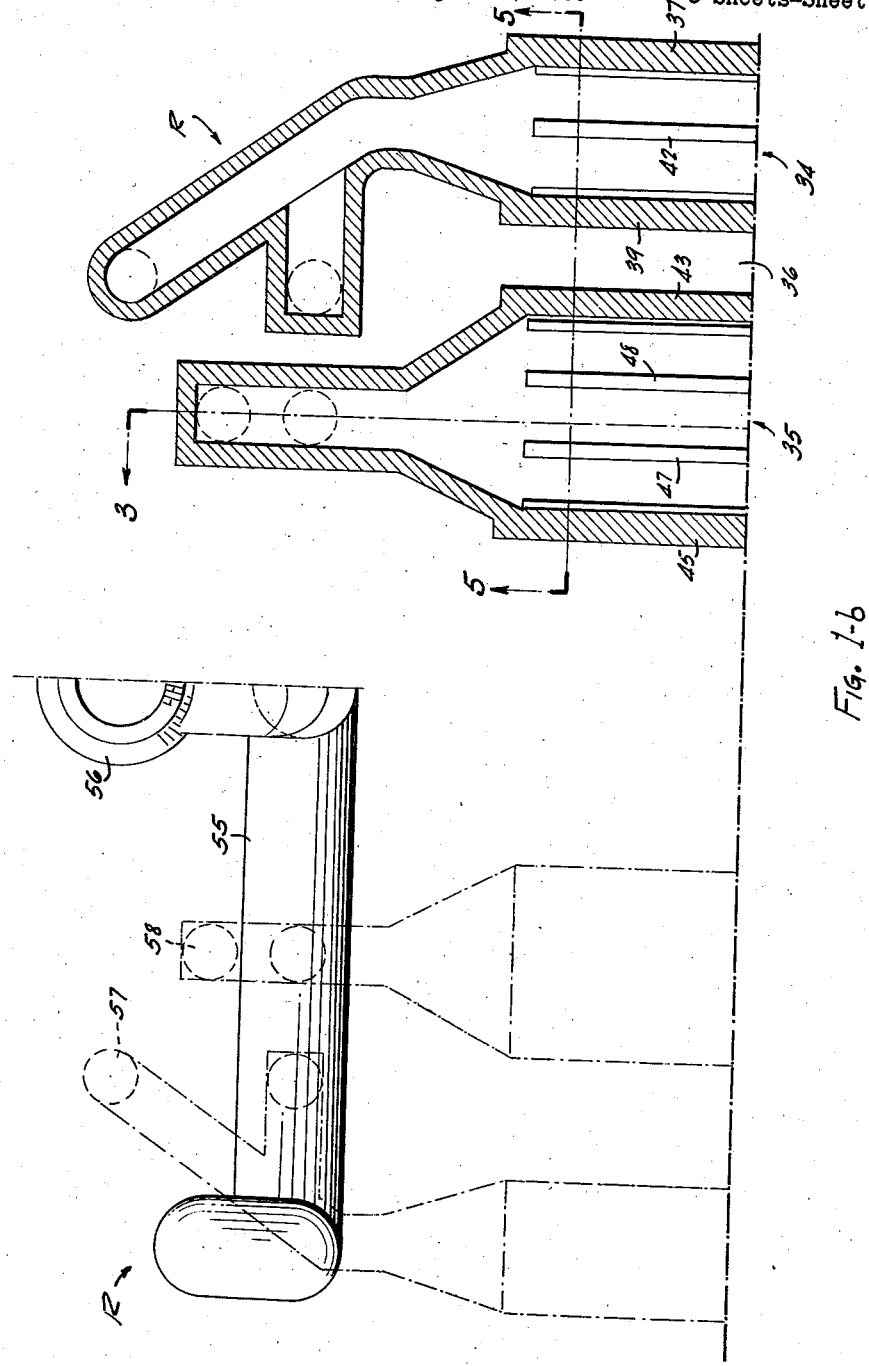
Fig. 1-b
INVENTORS
THOMAS A. CHAMBERS, CHESTER E. DAVIS,
BY ALWIN F. FRANZ AND JOHN T. WHITING.
Joshua R H Potts
ATTORNEY.

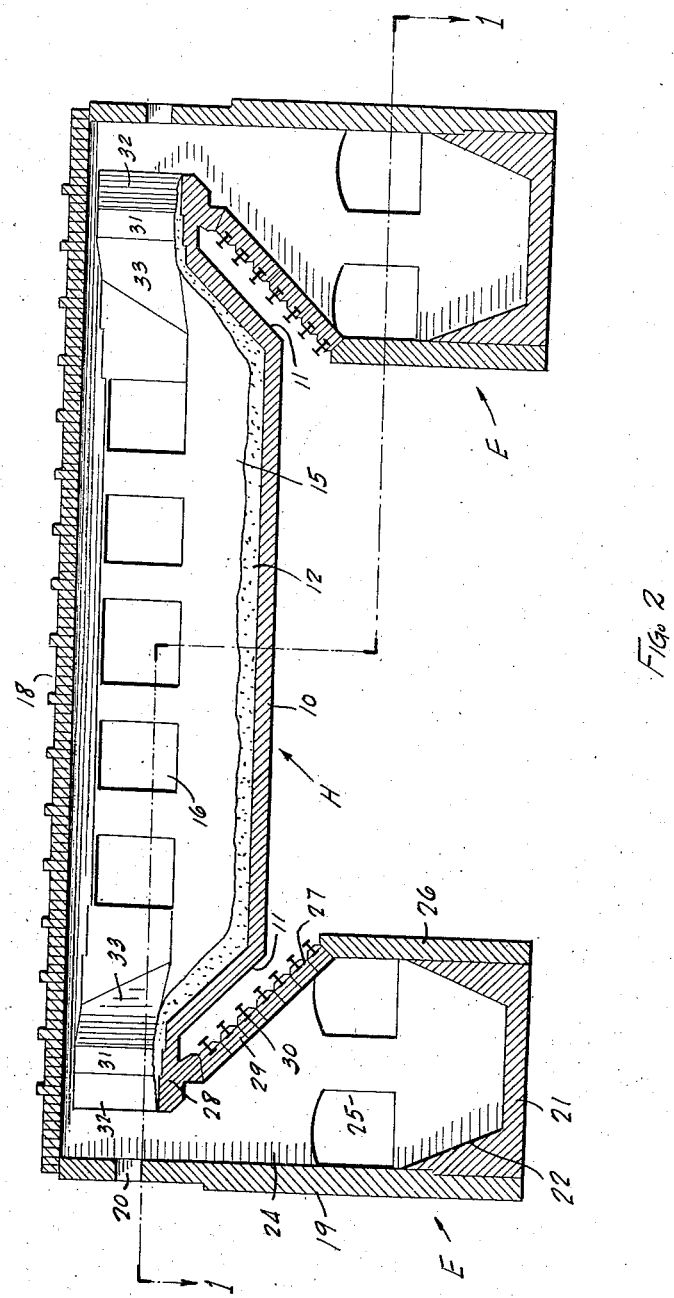

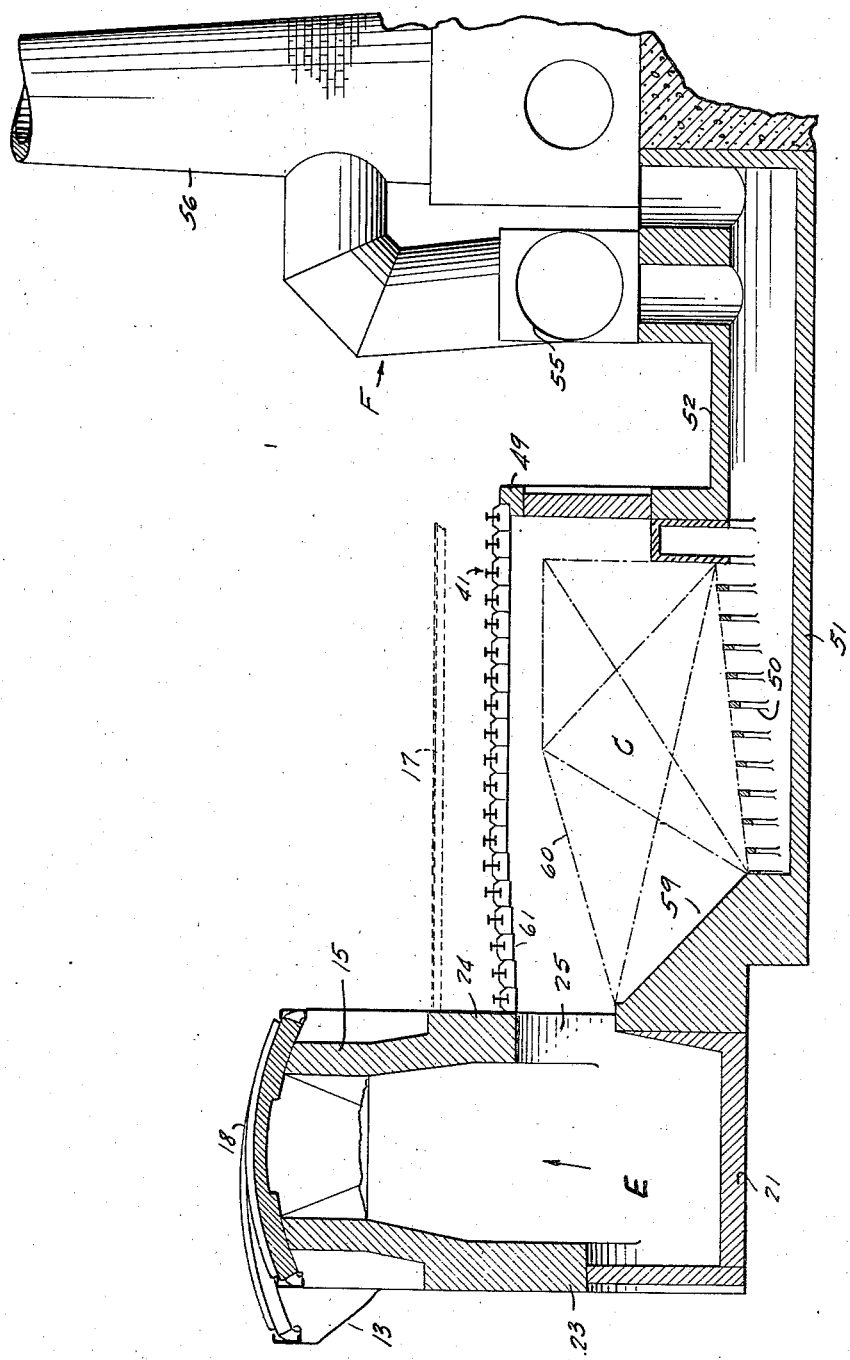

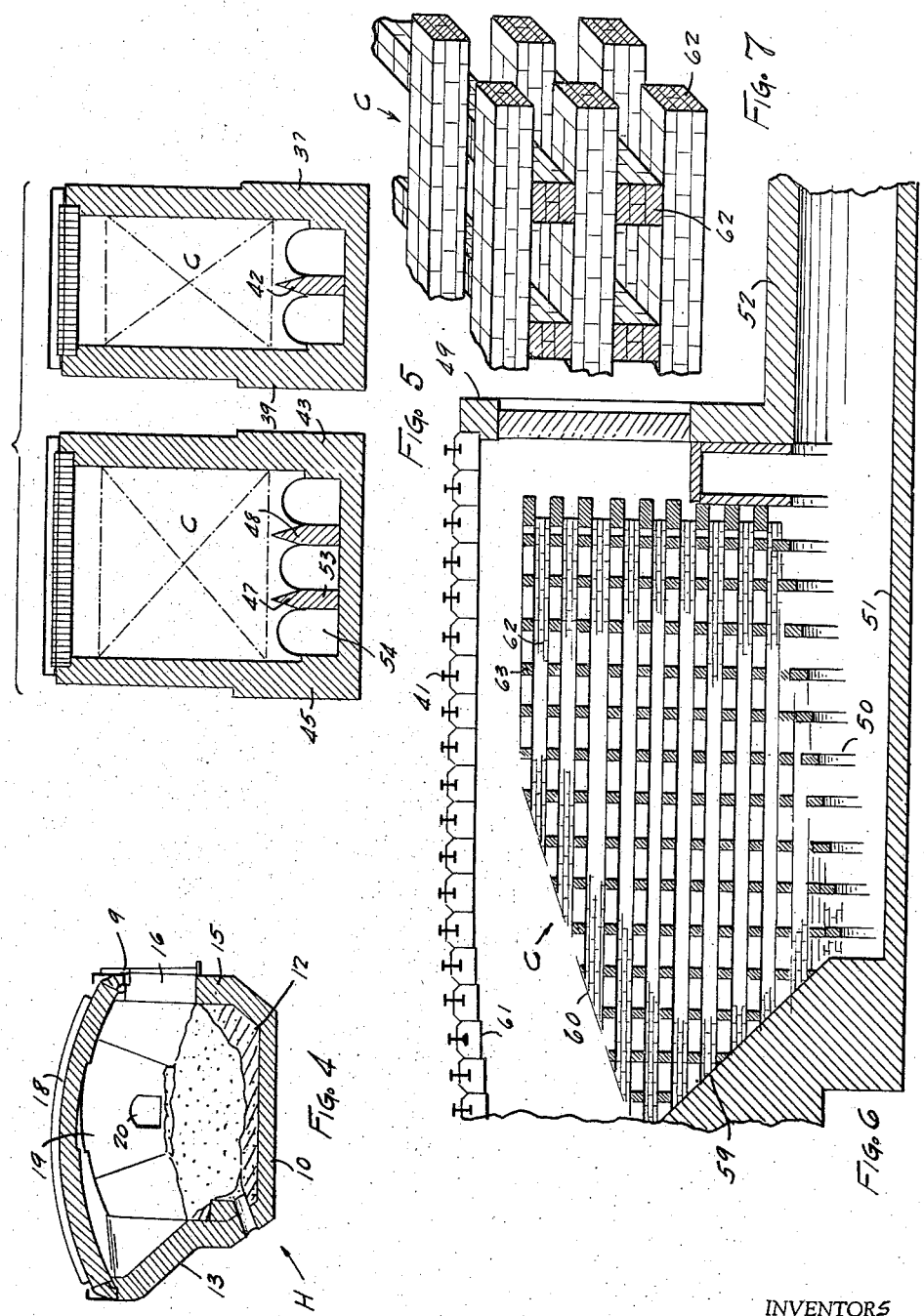

Patented Dec. 31, 1940

2,226,922

UNITED STATES PATENT OFFICE 2,226,922

REGENERATOR FURNACE

Thomas A. Chambers, Chester E. Davis, and Alwin F. Franz, Norristown, and John T. Whiting, Radnor, Pa.

Application September 18, 1939, Serial No. 295,422

7 Claims. (Cl. 263—15)

This invention relates to furnace constructions and is concerned primarily with furnaces of the regenerating type which are employed in the steel industry.

A regenerating furnace of the type which is intended to be improved by this invention ordinarily includes a hearth with which communicates, at each end, a regenerating structure. The mode of operation of one of these furnaces may be briefly outlined by noting that the materials to be treated by the furnace are, of course, charged into the hearth. Fuel, in the form of oil, is introduced into the hearth, first at one end and then at the other, depending on which generator is at that time providing the hot air which is combined with the fuel for the combustion. The hot air comes in from the regenerator at one end, and is mixed with the atomized oil to effect the combustion. The hot gases of combustion are discharged through the regenerator at the other end. This regenerator includes what is known as a checkerwork construction which absorbs a large amount of the heat from the gases as it passes therethrough.

After operation in this direction for a predetermined period, say fifteen minutes, the direction of operation is reversed. Fuel is now introduced from the opposite end, and the regenerator at this same end is employed as the means for introducing the hot air. As the air passes through this regenerator it takes heat from the checkerwork construction, so that at the time of passing into the hearth, where it mixes with the atomized fuel oil, it is at a high temperature. Of course, the hot gases are discharged through the regenerator at the opposite end.

At the present time considerable difficulty has been experienced in obtaining the desired degree of efficiency in fuel consumption, due, it is believed, largely to the fact that the hot air is not introduced into the hearth at a sufficiently high pressure to provide required blast effects.

Accordingly this invention has in view, as an important object, the provision of a regenerating furnace of the character above noted which includes structure for building up pressure on the air as it passes from the regenerator into the hearth so that the air enters the hearth as a blast.

In carrying out this idea in a practical embodiment the invention has in mind the provision of a furnace structure in which the hearth is formed immediately beneath the fuel inlet with a structure of varying horizontal cross section that communicates with the regenerator, the narrower cross section being disposed immediately adjacent to the fuel inlet, with the wider cross section communicating with the regenerator. This funnel-shaped structure takes the hot air from the regenerator, and due to the narrowing cross section pressure is built up thereon so that at the zone where the air is mixed with the incoming fuel it attains the proportions of a blast, whereby the actual combustion of the fuel is more evenly spread over the hearth area with accompanying results in the form of improved efficiency.

Particular features and advantages of the invention are associated with the manner in which this funnel-shaped structure is incorporated in the furnace.

With the now known regenerating furnaces, the regenerators do not operate with the maximum degree of efficiency because of the fact that the hot gases which are exhausted from the furnace travel over one route or pathway, through the checkerwork, while the incoming air passes over a different route or pathway in the regenerator. Thus the checkerwork construction of the regenerator does not function to efficiently transfer the heat from the exhaust gases to the incoming air.

Another highly important object of the present invention, therefore, is the provision of a regenerator furnace of the character above noted in which the regenerators are so designed that the incoming air passes over exactly the same pathway through the checkerwork structure of the regenerator as would the hot gases which were exhausted from the furnace through the regenerator. Thus every portion of the checkerwork construction which has been subject to the effect of the hot exhaust gases is subject to the effect of the incoming air to the same degree.

Particular objects and features of the invention are associated with the provision of a regenerator which is constructed to carry out this principle.

The invention, therefore, comprises a regenerating furnace consisting of a hearth with an improved regenerator communicating with the hearth at each end thereof. Structure of varying cross section is included in the furnace at the joinder of each regenerator to the hearth to build up pressure on air as it comes from the regenerator to the hearth to convert the air into a blast. Each of the regenerators is also so constructed and designed that incoming air passes over exactly the same route or pathway through the checkerwork as have the hot gases in being exhausted from the furnace.

For a full and more complete understanding of the invention reference may be had to the following description and accompanying drawings, wherein Figure 1a is a portion of a plan view taken as sections through a furnace on two different horizontal planes; the sectional showing of Figure 1a being taken about on the planes represented by the lines 1—1 of Figure 2, Figure 1b is a view complemental to Figure 1a completing the plan view on the planes represented by the lines 1—1 of Figure 2, Figure 2 is a vertical section through the hearth taken about on the plane represented by the line 2—2 of Figure 1a, Figure 3 is a side view taken as a sectional showing on the planes represented by the lines 3—3 of Figures 1a and 1b, Figure 4 is a transverse vertical section through the hearth taken about on the plane represented by the line 4—4 of Figure 1a, Figure 5 is a vertical section through one of the regenerators taken about on the plane represented by the line 5—5 of Figure 1b, Figure 6 is an enlarged detailed sectional view somewhat similar to Figure 3, through a portion of one of the regenerators, developing the checkerwork structure thereof, and Figure 7 is an enlarged detailed view in perspective of a portion of the checkerwork structure.

Referring now to the drawings, wherein like reference characters denote corresponding parts, the construction comprising the hearth of the furnace is referred to in its entirety by the reference character H, and is shown more particularly in Figures 1a, 2, at the left-hand end of Figure 3, and Figure 4.

The hearth H comprises a bottom wall 10 (see Figures 2 and 4) which is properly supported from suitable piers (not illustrated) and which bottom wall terminates at each end in upwardly inclined portions 11. This bottom wall 10, as well as the inclined portions 11, is covered by a suitable refractory, as shown at 12. Upstanding from the bottom wall 10 is an inclined front wall 13 (see Figures 1a, 3 and 4). This inclined wall 13 extends outwardly centrally of the hearth, but gradually blends in with the end structures of the hearth by the angularly disposed walls shown at 14 in Figure 1a.

Also upstanding from the bottom wall 10 is a rear or inner wall 15 which is formed with a plurality of charging openings 16. It is through these openings 16 that the materials which are to be treated by the furnace are charged. The so-called charging surface of the furnace is represented somewhat diagrammatically at 17 in Fig. 3, and indicates the surface over which vehicles containing the materials may travel to charge the materials through the openings 16. Suitable closure means for the openings 16 are represented somewhat diagrammatically at 9 in Figure 4.

The front wall 13, together with the portions 14 and the rear wall 15, are connected by an arched roof, as shown at 18. This roof 18 also extends over the end structures of the hearth, which are of duplicate construction, as illustrated in Figure 2, and each of which is referred to in its entirety by the reference character E.

Referring to Figures 2 and 3, each end structure E comprises an end wall 19 which is continued upwardly and constitutes the end wall of the hearth, and this wall 19 is formed with an opening at 20 through which fuel is introduced into the hearth. This end wall 19 upstands from a bottom wall 21, there being a structure presenting an inclined surface at 22 that connects the bottom wall 21 with the end wall 19.

The end structure E also includes a front wall 23 (see Figures 1a and 3) and a rear wall structure 24 that is one wall of one of the regenerators to be hereinafter described. This wall 24 is formed with openings at 25 that communicate with their respective regenerator S.

Now referring to Figure 2, each of the end structures E includes an inner wall 26 which is of a height appreciably less than the end wall 19. An inclined roof or arch is referred to in its entirety by the reference character 27, and is shown as connecting this inner wall 26 with a continuation 28 of the inclined portion 11 of the hearth bottom. This arch 27 preferably takes the form of a plurality of interlocking refractory brick units 29 that are supported by I beam supports shown at 30.

It will be noted that at the point where the arch 27 joins the hearth bottom at 28 there is just a narrow space between the extremity of the arch and the end wall 19. Thus, a passage of varying cross section generally similar to a funnel is provided in the end construction E.

Referring to Figure 1a, immediately above the continuation 28 of the hearth bottom, the inner wall 15, and the front wall 23, the hearth carries a Venturi-like structure defined by waist walls 31, which join at each side with inclined walls 32 and 33. The inclined walls 32 join in with the front wall 23 and rear wall 24 of the end structures E, respectively, while the walls 33 join in with the rear wall 15 and inclined portions 14 of the front wall.

It will be noted that the fuel is introduced through the opening 20 into a chamber that is defined by the end wall 19, front wall 23, rear wall 24, and inclined walls 32, and the roof 18 (Figure 2), and the air in the form of a blast is introduced into the same chamber as it comes from the regenerator through the vertical passage of the end structure E. The mixture of air and fuel then passes between the waist walls 31 of the Venturi-like structure into the melting hearth.

The regenerators which communicate with the hearth H at each end are of duplicate construction, and only one of them needs to be here described for the purpose of this specification.

Each of the regenerators is referred to in its entirety by the reference character R (Figures 1a and 1b) and each is shown as comprising a two tunnel unit 34, and a three tunnel unit 35 that are constructed in spaced relationship, as shown at 36. The two tunnel unit 34 is shown as being defined by an outer wall 37 that is connected with the end wall 19 of the corresponding end structure E by an inclined wall 38; an inner wall 39 being joined with the rear wall 24 of the end structure E between the openings 25 by an inclined wall 40, and a roof or arch 41 (see Figure 3).

Intermediate the walls 37 and 39 is a partition structure 42 which divides this portion of the regenerator into a two tunnel construction. Similarly, the three tunnel unit 35 of the regenerator R comprises an inner wall 43 that is joined to the rear wall 24 of the end structure E between the openings 25 by the slightly inclined portion 44; another wall 45 that is connected to the wall 26 of the end structure E by an inclined wall 46, and a roof or arch corresponding to the roof or arch 41 (Figure 3).

Arranged between the walls 43 and 45 are partition structures 47 and 48, which divide this portion of the regenerator into the three tunnel construction.

At the ends removed from the joinder with the hearth the tunnel units 34 and 35 are provided with end walls 49.

Each of the tunnels of the tunnel units 34 and 35 is provided with a checkerwork construction which is referred to in its entirety by the reference character C (see Figures 6 and 7), and which is represented diagrammatically in Figure 3. These checkerwork constructions have what are, in effect, inclined bottom openings defined by supporting elements 50 that are spaced above the bottom 51 of the regenerator.

Extending rearwardly of the end walls 49, and spaced from the bottom 51, are walls 52, and partitions 53 extending from the walls 52 to the bottom wall 51 define conduits 54 (see Figure 5) that communicate with a flue F through the medium of a manifold 55 (see Figure 1b). This flue F is in turn in communication with a stack 56. Means for introducing air under pressure into each of the conduits 54 are represented in Figure 1b somewhat diagrammatically at 57 and 58, respectively.

The particular design of the checkerwork construction C and the relationship to the wall structure of the generator housing the same is particularly important. It will be noted that there is a wall presenting an inclined surface 59 that extends from the wall 24 immediately beneath each opening 25 to a point adjacent the bottom wall 51, which latter point represents the lowermost point of the checkerwork.

As clearly brought out in Figure 6, the checkerwork structure C has an inclined upper surface at 60 which corresponds in a manner to the inclined wall at the bottom provided by the supports 50. Immediately above the inclined part 60 the roof 41 takes a slight downward incline to the upper edge of the opening 25, as shown at 61.

The checkerwork construction C, in each of the tunnels of the units 34 and 35, comprises a plurality of longitudinally extending members 62 that are preferably made from a brick material having good heat absorption qualities, and which are maintained spaced apart from similar longitudinally extending members immediately thereabove by transversely extending members 63 that are also spaced apart.

The operation of the above described furnace may be briefly described by first noting that materials are charged into the hearth H through the openings 16. Upon starting the furnace into operation, air under pressure comes from the means represented at 57 and 58 of the respective regenerator, passes through the conduits 54 and the checkerwork structure C, through the openings 25 to the interior of the end structures E. From the latter the air passes upwardly to the chamber defined by the end wall 19, outer wall 23, rear wall 24, inclined surfaces 32, and top 18, and as the air enters into this chamber its velocity is increased due to the inclined construction of the arch 27. Fuel is also introduced into this chamber through the opening 20.

The mixture of air and fuel is then forced past the waist walls 31, into the hearth, where combustion takes place. The hot gases which are generated by combustion are exhausted through the regenerator at the opposite end. In the exhausting of these gases they pass through the openings 25, and through the checkerwork structure C of the tunnel units 34 and 35 of the regenerator at that end of the furnace. During this passage through the checkerwork structure C the latter absorbs heat from the gases. These gases finally pass through the conduits 54 and flue F to the stack 56.

It will be noted that upon first being introduced into the regenerator the gases encounter the inclined surface 60 of the checkerwork structure C. Thus a full cross sectional area of the checkerwork construction such as defined by this inclined surface 60 is effective to have the hot air and gases pass therethrough, and the passage of the gases is, in no sense of the word, localized.

After the furnace has been operated in this direction for a predetermined period, for example, fifteen minutes, the direction of operation is reversed. Communication to the stack 56 of the flue F will be cut off at the regenerator through which the gases were being exhausted, and air will now be supplied through the conduits 54 to this regenerator. As this air first engages the checkerwork C it will strike the inclined bottom surface defined by the supports 50 and pass upwardly through the checkerwork structure over substantially the same cross sectional route traveled by the hot gases in being exhausted. Thus the incoming air takes heat from the checkerwork structure, and passes through the openings 25 into the end structures E under condition of high temperature. This high temperature is, of course, accompanied by an increase in pressure in the air which cooperates with the inclined arch 27 of the end structure to build up pressure and velocity of the air as it enters into the chamber, where it mixes with the fuel oil.

While a preferred specific embodiment of the invention is hereinbefore set forth it is to be clearly understood that the invention is not to be limited to the exact constructions illustrated and described, because various modifications of these details may be provided in putting the invention into practice within the purview of the appended claims.

We claim:

1. In a regenerating furnace, a hearth comprising a main body portion defined by top, bottom, front and rear walls, an end structure communicating with the main body portion at each end, each of said end structures comprising an end wall, an inner wall, front and rear walls, the end wall of each of said end structures being formed with a fuel inlet communicating with the main body portion of the hearth, the inner wall of each structure carrying an inclined arch, said front and rear walls of the end structure converging toward said fuel inlet and cooperating with said arch to provide a varying cross sectional area in the end structure with the smaller cross sectional area adjacent to said fuel inlet, and means for introducing a forced draft of air into said end structure beneath said arch.

2. In a regenerating furnace, a hearth comprising a main body portion defined by top, bottom, front and rear walls, an end structure communicating with the main body portion at each end, each of said end structures comprising an end wall, an inner wall, front and rear walls, the end wall of each of said end structures being formed with a fuel inlet communicating with the main body portion of the hearth, the inner wall of each structure carrying an inclined arch, said front and rear walls of the end structure converging toward said fuel inlet and cooperating with said arch to provide a varying cross sectional area in the end structure with the smaller cross sectional area adjacent to said fuel inlet, and means carried by the rear wall of each of said end structures for introducing a forced draft of air into the respective end structure beneath said arch.

3. In a regenerating furnace of the character described, a regenerator including a tunnel unit housing a heat transfer checkerwork structure, means for introducing exhausting gases to said checkerwork structure, said checkerwork structure presenting an inclined top surface meeting said exhaust gases, said checkerwork structure also having a correspondingly inclined surface at the bottom that is spaced and offset from said first mentioned inclined surface by the depth of the checkerwork structure, said checkerwork including an inclined front surface connecting said top and bottom surfaces and means for introducing a forced draft of air into said checkerwork structure along said inclined bottom surface.

4. In a regenerating furnace of the character described, a regenerator including a tunnel unit defined by top and bottom walls, side walls, and inner and outer end walls, said inner end wall being formed with an opening adjacent the top which is adapted to have exhaust gases pass thereinto, said outer end wall having an opening at the bottom through which a forced draft of air is adapted to pass, there being an inclined surface connecting the first mentioned opening in the inner end wall and the said bottom, and a checkerwork structure in said tunnel presenting an inclined surface one end of which is disposed beneath said opening in the inner end wall, with the other end of the inclined surface spaced from the said top, said checkerwork structure including a correspondingly inclined surface at the bottom having one end disposed above the opening in the outer end wall with the other end slightly spaced from the bottom.

5. In a regenerating furnace, a hearth comprising a main body portion defined by top, bottom, front and rear walls, an end structure communicating with the main body portion at each end, each of said end structures comprising an end wall, an inner wall, front and rear walls, the end wall of each of said end structures being formed with a fuel inlet communicating with the main body portion of the hearth, the inner wall of each structure carrying an inclined arch providing a varying cross sectional area in the end structure with the smaller cross sectional area adjacent to said fuel inlet, a regenerator adjacent the rear wall of each end structure, said rear wall being formed with an opening establishing communication between the said end structure and said regenerator, a heat transfer checkerwork structure in each of said regenerators, said checkerwork structure presenting an inclined surface to said opening in the said rear wall, and means for introducing a forced draft of air into said regenerator beneath said checkerwork structure, said checkerwork structure presenting an inclined face corresponding to said first mentioned inclined face.

6. In a regenerating furnace of the character described, a hearth comprising a main body portion with an end structure at each end, each of said end structures including a wall formed with a fuel inlet, a regenerator adjacent each end structure, means for establishing communication between each regenerator and its respective end structure, said end structure having an inclined wall defining an arch interposed between said communicating means and said fuel inlet, a heat transfer checkerwork structure in each of said regenerators, said checkerwork structure having an inclined face at the top, and a correspondingly inclined face at the bottom, said inclined face at the top being disposed adjacent said communicating means, and means for introducing a forced draft of air into the checkerwork structure beneath said inclined face at the bottom.

7. In a regenerating furnace of the character described, a regenerator including a tunnel unit housing a heat transfer checkerwork structure, said checkerwork structure including an inlet port for introducing exhaust gases into the checkerwork structure at the top over a wide area of the checkerwork, said checkerwork having a top surface that is inclined to a normal to said inlet port and another inlet at the bottom for introducing a draft of forced air over a correspondingly wide area of the checkerwork structure, said checkerwork structure having an inclined bottom surface that is offset from said inclined top surface, and guide means between said top and bottom inclined surfaces for controlling the travel of gases through said checkerwork.

JOHN T. WHITING.
CHESTER E. DAVIS.
ALWIN F. FRANZ.
THOMAS A. CHAMBERS.